United States Patent [19]
Ozue

[11] Patent Number: 6,008,961
[45] Date of Patent: *Dec. 28, 1999

[54] RECORDING METHOD OF A HELICAL SCAN SYSTEM FOR RECORDING DATA TO A TAPE-SHAPED RECORDING MEDIUM

[75] Inventor: Tadashi Ozue, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/697,557

[22] Filed: Aug. 28, 1996

[30] Foreign Application Priority Data

Aug. 29, 1995 [JP] Japan ................................ 7-243814

[51] Int. Cl.$^6$ .................................................. G11B 15/18
[52] U.S. Cl. .......................................... 360/72.2; 369/72.1
[58] Field of Search ................................. 360/72.1, 72.2, 360/48, 49, 18, 24, 32, 73.03, 73.08, 71; 386/6–8, 69, 81, 95

[56] References Cited

U.S. PATENT DOCUMENTS

| | | | |
|---|---|---|---|
| 4,833,549 | 5/1989 | Yoshimoto et al. | 360/32 |
| 4,837,640 | 6/1989 | Ozaki et al. | 360/72.2 |
| 5,021,896 | 6/1991 | Horino | 360/72.2 |
| 5,321,561 | 6/1994 | Barr et al. | 360/48 |
| 5,335,117 | 8/1994 | Park et al. | 360/48 |
| 5,359,462 | 10/1994 | Park et al. | 360/10.2 |
| 5,566,032 | 10/1996 | Cleveland et al. | 360/72.2 |
| 5,568,328 | 10/1996 | Takahashi et al. | 360/18 |

FOREIGN PATENT DOCUMENTS 2192089  12/1987  United Kingdom .
WO 95/22826  8/1995  WIPO .

*Primary Examiner*—Thang V. Tran
*Attorney, Agent, or Firm*—Frommer Lawrence & Haug, LLP; William S. Frommer

[57] ABSTRACT

A flat portion of a reproduction waveform is set a length in which data of one or more sync blocks can be arranged. The same ID is written by only the number of times corresponding to the number of sync blocks obtained from each track by one scan. When data is recorded on the sync block unit basis and the searching operation is executed by using the ID of the sync block.

2 Claims, 4 Drawing Sheets

RECORDING METHOD OF A HELICAL SCAN SYSTEM FOR RECORDING DATA TO A TAPE-SHAPED RECORDING MEDIUM

BACKGROUND OF THE INVENTION

1. Field of the Invention

The present invention relates to a recording method suitable for use in a digital data recording/reproducing apparatus for recording/reproducing digital data or the like to/from a tape-shaped recording medium.

2. Description of the Related Art

Since a tape streamer drive for recording/reproducing digital data to/from a magnetic tape has an enormous recording capacity, it is widely used to back up data stored in a storage device such as a hard disc or the like. The tape streamer drive is not only used for backup for a storage device but also suitable for recording large files such as motion picture data. As such a tape streamer drive, for example, a tape streamer drive of a helical scan type for recording/reproducing digital data to/from a magnetic tape by using, for example, a tape cassette similar to a tape cassette of an 8 mm VTR and using rotary heads is known.

In the tape streamer drive of the helical scan type, data is recorded to oblique tracks by two heads having different azimuth angles. For searching operation, to search a recording position of desired data, the tape is fed at a high speed and the data is reproduced at a high speed. When the high speed reproduction is executed, the heads scan over a plurality of tracks. While the tape is reproduced at a high speed as mentioned above, the search code is detected and while the search code and a target place are compared, the searching operation is executed.

As a method of recording the search code for searching operation, a method in which predetermined tracks are set to recording tracks of the search code and the search code is recorded in the whole track and a method in which recording areas of the search code is provided in a part of each track and the search code is recorded in the recording areas of the search code are considered.

The method in which the predetermined tracks are set to the recording tracks of the search code and the search code is recorded in the whole track has an advantage of high-speed search, because the search code can be certainly detected even in a high-speed reproducing mode. But it has a disadvantage that a recording efficiency of data is deteriorated, because the predetermined tracks are set to the recording tracks of the search code.

On the other hand, the method of the recording areas of the search code are provided in a part of each track and the search code is recorded in the recording areas of the search code, there is a case such that the search code cannot be detected at the time of the high-speed search, so that it is disadvantageous to the high-speed search.

Further, when the predetermined tracks are set to the recording tracks of the search code or when a part of each track is set to the recording areas of the search code as mentioned above, a process for detecting whether reproduction data is data in the search code areas or not is necessary, so that there is a problem such that the process is complicated.

It is, consequently, considered that the data is recorded on a sync block unit basis and the search code is recorded in each sync block. That is, the data is divided into a plurality of blocks and a sync and an ID are added to each block to thereby construct the sync block, and the data is recorded on the sync block unit basis.

When the data has been recorded on the sync block unit basis as mentioned above, a clock is reproduced from the sync of each sync block by a PLL and the data can be demodulated. By including the search code in the ID, therefore, the search code can be detected upon searching while the tape is reproduced at a high speed. Thus, since any special search code areas are unnecessary, the recording efficiency is improved. Since the search code is recorded in the whole area, it is advantageous for the high-speed search. Further, the process for detecting whether the reproduction data is that in the search code areas or not is unnecessary.

When the data is recorded on the sync block unit basis and the search code is included in each sync block as mentioned above, however, there is a case such that heads cannot pick up the sync blocks and the search code cannot be detected in dependence on the relation between the track pitch and the head width or the times speed or the like. There is also a case such that the searching operation cannot be certainly performed due to a detection error of the search code.

OBJECTS AND SUMMARY OF THE INVENTION

It is, therefore, an object of the invention to provide a recording method in which when data is recorded on a sync block unit basis and a search code is recorded in each sync block, the search code can be certainly detected.

The invention relates to a recording method of a helical scan system for recording data to a tape-shaped recording medium by rotary heads, comprising the steps of: dividing data of one track to be formed onto a tape-shaped recording medium into a plurality of blocks; allocating ID information including a search code to each block and recording the data onto the track on the block unit basis; when searching target data while feeding the tape-shaped recording medium at a high speed in the recording step, recording the ID information onto the track so as to arrange at least one the search code into a flat portion of a reproduction waveform to be reproduced.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
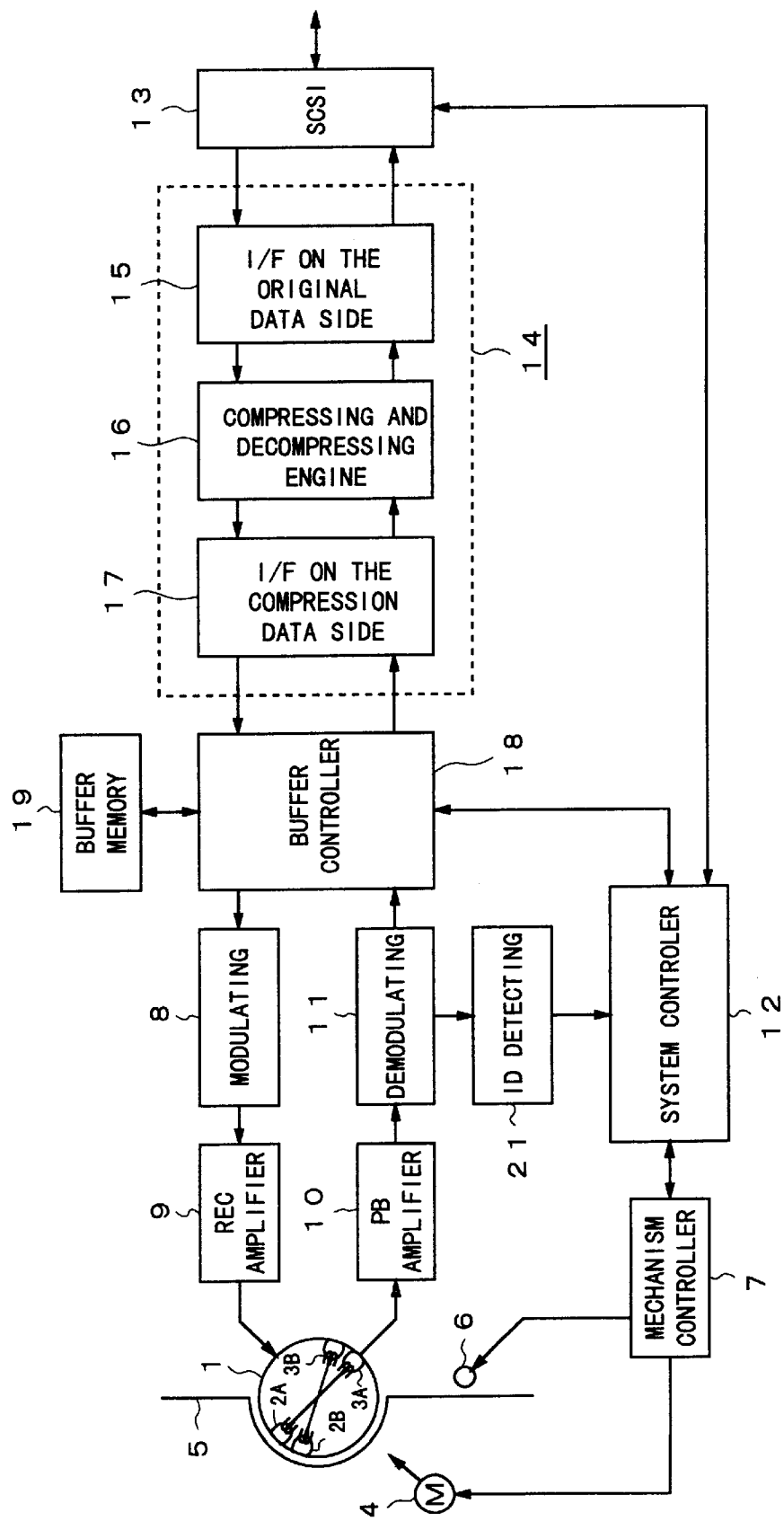
FIG. 1 is a block diagram of an example of a tape streamer drive to which the invention is applied.

An embodiment of the invention will be described hereinbelow with reference to the drawings. FIG. 1 shows an example of a tape streamer drive to which the invention is applied. The tape streamer drive records/reproduces data to/from a magnetic tape by using a magnetic tape similar to that of the 8 mm VTR by the helical scan type.

That is, in FIG. 1, reference numeral 1 denotes a rotary drum. Recording heads 2A and 2B and reproducing heads 3A and 3B are arranged in the rotary drum 1. The recording heads 2A and 2B have what is called a double-azimuth structure in which they are integratedly constructed so that two gaps having different azimuth angles are extremely close to each other. Similarly, the reproducing heads 3A and 3B have the double-azimuth structure.

A magnetic tape 5 is wound around the rotary drum 1. The magnetic tape 5 is pulled out from a cassette similar to a tape cassette of an 8 mm VTR. The rotary drum 1 is rotated by a drum motor 4. The magnetic tape 5 is fed by a capstan motor 6 and a pinch roller (not shown). The drum motor 4 and capstan motor 6 are rotated under the control of a mechanism controller 7. Processes such as drum servo, tracking servo, and the like are executed by the mechanism controller 7. The mechanism controller 7 and a system controller 12 for performing the whole control are bidirectionally connected.

Data is recorded/reproduced by the helical scan method by using the rotary drum 1 in which the recording heads 2A and 2B and reproducing heads 3A and 3B are arranged as mentioned above.

That is, recording data to the magnetic tape 5 is modulated by a modulating circuit 8 and is supplied to the recording heads 2A and 2B through a recording amplifier 9. The data is recorded along oblique tracks onto the magnetic tape 5 by the recording heads 2A and 2B. The recording heads 2A and 2B have different azimuth angles and the oblique tracks are tracks having the azimuth angles which are different every track.

Figure 2:
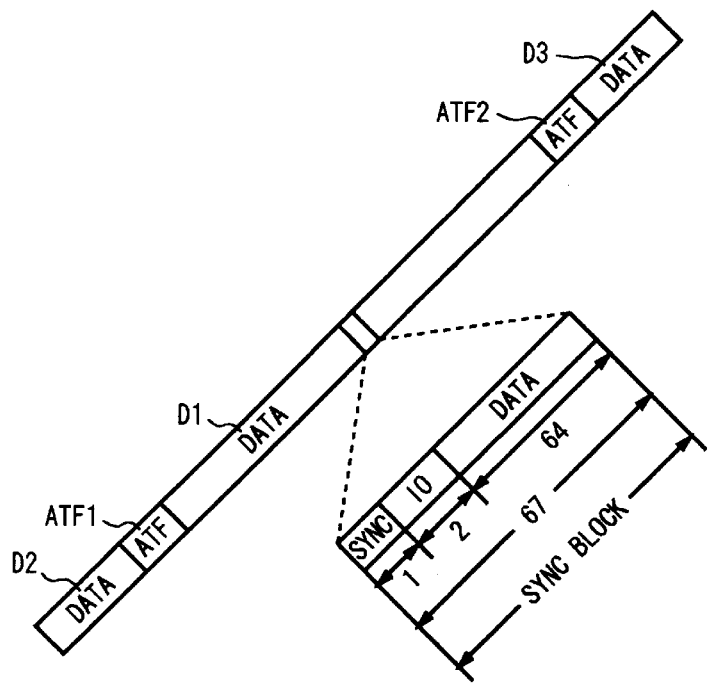
FIG. 2 is a schematic diagram which is used for explaining an example of the tape streamer drive to which the invention is applied.

Data is recorded onto the magnetic tape 5 on a sync block unit basis. FIG. 2 shows a structure of the track. As shown in FIG. 2, a data area D1 is provided in the center of the track, ATF (Automatic Track Following) areas ATF1 and ATF2 for tracking are provided on both sides of the track, and data areas D2 and D3 are provided in end portions which are located on the outer side than the ATF areas ATF1 and ATF2.

Data is recorded on the sync block unit basis in the data areas D1 to D3. One sync block is constructed by 67 symbols comprising: a sync of one symbol; an ID of two symbols; and user data of 64 symbols. A search code is included in the ID together with information such as block number, track number, azimuth angle, and the like.

Figure 3:
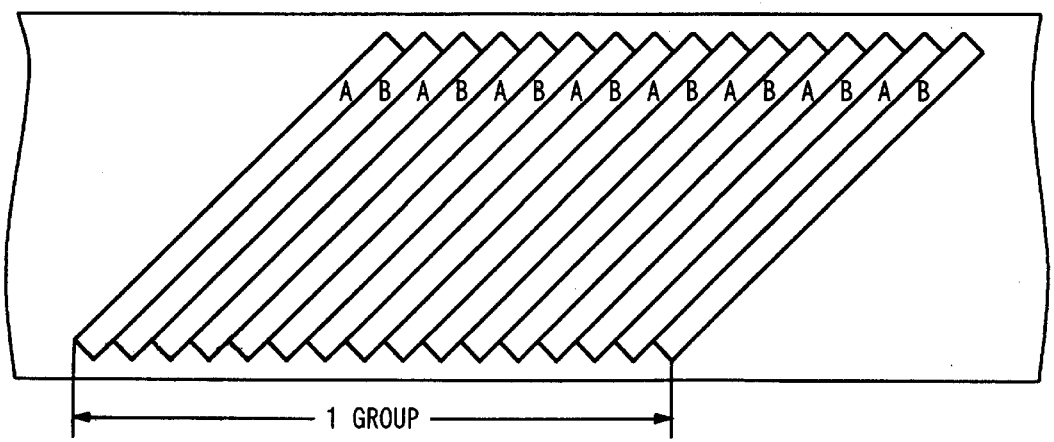
FIG. 3 is a schematic diagram which is used for explaining an example of the tape streamer drive to which the invention is applied.

The data recording is executed on a unit basis of one group. One group is constructed by, for example, 16 tracks of 8 tracks of an azimuth A and 8 tracks of an azimuth B as shown in FIG. 3. The number of search code is increased on a group unit basis.

In FIG. 1, the data on the magnetic tape 5 is reproduced by the reproducing heads 3A and 3B. Outputs of the reproducing heads 3A and 3B are supplied to a demodulating circuit 11 via a playback amplifier 10. The reproduced data is demodulated by the demodulating circuit 11.

As mentioned above, the data is recorded on the sync block unit basis and each sync block includes the sync, ID, and user data. Upon reproduction, a clock is reproduced by a PLL by reproducing the sync and the data of one sync block is demodulated by using the clock. In case of feeding the tape at a high speed, therefore, if the data of one sync block can be reproduced, the data can be demodulated.

In the tape streamer drive, an SCSI (Small Computer System Interface) is used for inputting and outputting data. That is, when recording data, data is transmitted from a host computer (not shown), for example, by setting 512 bytes to one segment. The data is inputted through the SCSI 13.

The tape streamer drive also has a data compressing and decompressing unit 14 for compressing and decompressing data. The data compressing and decompressing unit 14 is constructed by an interface 15 on the original data side, a data compressing and decompressing engine 16, and an interface 17 on the compression data side. Data to the data compressing and decompressing unit 14 is transferred by a DMA (Direct Memory Access). Each of the interface 15 on the original data side and interface 17 on the compression data side has an FIFO (First-In First-Out) register for adjusting a DMA transfer speed.

The data compressing and decompressing engine 16 executes a compressing and decompressing process of data by an LZ code. The LZ code is used to compress the data by detecting a repetition of an input character train. That is, an exclusive-use code is allocated to the character train which was processed in the past and is stored in a form of a dictionary. The input character train and the dictionary are compared and when they coincide, the input character train is rewritten to a dictionary code. The character train which doesn't coincide with the dictionary is registered one by one in the dictionary. As mentioned above, by registering the input character train into the dictionary and rewriting the character train to the code of the dictionary, the data is compressed.

When recording data, data is transmitted from the host computer, for example, by setting 512 bytes to one segment. The data is inputted through the SCSI 13. An output of the SCSI 13 is supplied to the data compressing and decompressing engine 16 via the interface 15 on the original data side of the data compressing and decompressing unit 14. The data is compressed by the data compressing and decompressing engine 16 by using the LZ code. An output of the data compressing and decompressing engine 16 is outputted through the interface 17 on the compression data side.

An output of the interface 17 on the compression data side is once stored into a buffer memory 19 under the control of a buffer memory controller 18. An output of the buffer memory 19 is supplied to the modulating circuit 8. The recording data is modulated by the modulating circuit 8. An output of the modulating circuit 8 is supplied to the recording heads 2A and 2B via the recording amplifier 9. The data is recorded along the oblique tracks on the magnetic tape 5 by the recording heads 2A and 2B.

When the data is reproduced, the recording data on the magnetic tape 5 is reproduced by the reproducing heads 3A and 3B. Outputs of the reproducing heads 3A and 3B are supplied to the demodulating circuit 11 through the playback amplifier 10. The reproduction data is demodulated by the demodulating circuit 11. An output of the demodulating circuit 11 is once stored in the buffer memory 19 under the control of the buffer memory controller 18.

An output of the buffer memory 19 is supplied to the data compressing and decompressing engine 16 via the interface 17 on the compression data side of the data compressing and decompressing unit 14. The data is decompressed by the data compressing and decompressing engine 16, thereby returning to the original data. An output of the data compressing and decompressing engine 16 is supplied to the SCSI interface 13 via the interface 15 on the original data side.

As mentioned above, in the data streamer, the data is recorded on the sync block unit basis and the search code is included in the ID of each sync block. At the time of the reproduction, the clock is reproduced by the PLL by reproducing the sync and the data of one sync block is demodulated by using the clock. The ID is detected by an ID detecting circuit 21 from the demodulated output of the sync block. The ID is sent to the system controller 12 and the searching operation is executing by using the search code of the ID. When the tape is fed at a high speed, therefore, so long as the data of one sync block can be reproduced, the data can be demodulated. Upon searching, the tape is fed at a high speed and the search code is detected. Since no exclusive-use search area is provided, it is unnecessary to judge whether the reproduced code is the search code or not, so that the recording efficiency is improved.

Conditions which enable the search code to be certainly detected upon searching will now be considered.

The tape is fed at a high speed upon searching. Since the recording is executed by the heads having different azimuth angles, when the tape is fed at a high speed, its reproduction waveform output from the playback amprifier 10 becomes a waveform like beads as shown in FIG. 4.

Figure 4:
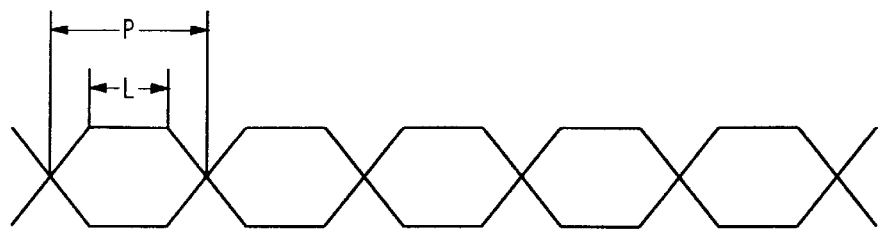
FIG. 4 is a waveform diagram which is used for explaining an example of the tape streamer drive to which the invention is applied.
Figure 5:
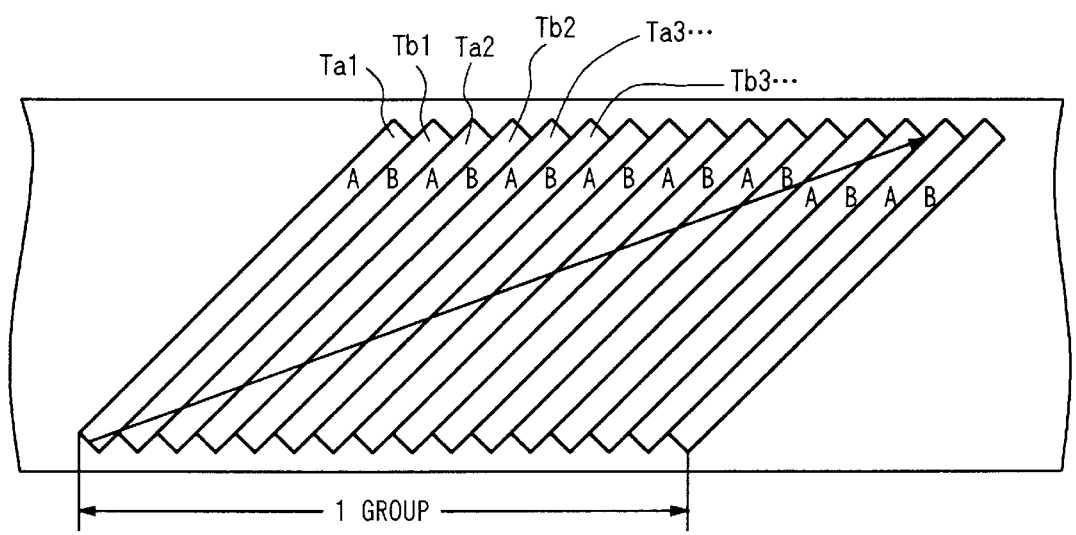
FIG. 5 is a schematic diagram which is used for explaining a head tracing on a tape.

That is, when the tape is fed at a high speed, the heads pass over a plurality of tracks Ta1, Tb1, Ta2, Tb2, . . . as shown in FIG. 5. Signals are recorded by the heads having different azimuth angles in the adjacent tracks Ta1, Tb1, Ta2, Tb2, . . . . When the head traces the track having the same azimuth angle as that of the head, therefore, a large reproduction output can be obtained. When the head traces the track having the azimuth angle different from that of the head, the reproduction output is small. For example, in case of tracing by the head of the A azimuth, portions of the large reproduction output correspond to a period of time when the head traces the tracks Ta1, Ta2, . . . of the A azimuth angle. Portions of the small reproduction output correspond to a period of time when the head traces the tracks Tb1, Tb2, . . . of the B azimuth. As shown in FIG. 4, therefore, the reproduction waveform becomes a waveform like beads. When the search is executed at an N-times speed, N bead waveforms (the portion in which the reproduction output is large) can be obtained by one scan.

Figure 6A:
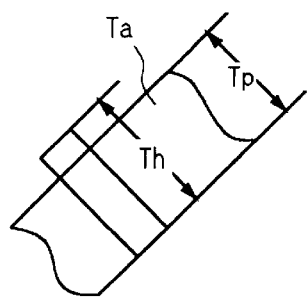
FIGS. 6A and 6B are schematic diagrams which is used for explaining an example of the tape streamer drive to which the invention is applied.
Figure 6B:
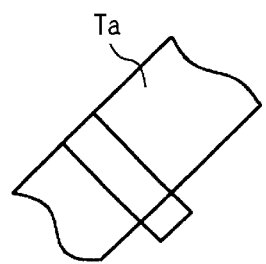

As shown in FIG. 6, when it is assumed that a head whose reproduction head width Th is wider than a track pitch Tp is used and, for example, the reproducing head of the azimuth angle A traces a track Ta of the same azimuth angle A, since the head completely traces on the track Ta for a period of time during which the head moves from a position shown in FIG. 6A to a position shown in FIG. 6B, the reproduction output becomes flat. A movement amount between them is equal to (Th−Tp). The period of time when the reproduction output is flat is a period of time when the reproduction output can be sufficiently obtained, namely, a period of time during which the maximum amplitude is obtained. In case of searching by detecting the search code of the ID of the sync block, therefore, it is necessary to detect the data of at least one sync block while the reproduction output is flat.

The track pitch is now set to Tp and the reproduction head width is set to Th as shown in FIG. 6 and the flat portion of the reproduction output is set to L and a pitch of the reproduction waveform is set to P as shown in FIG. 4. The pitch P of the reproduction waveform corresponds to the reproduction waveform of two tracks and (Th−Tp) corresponds to the flat portion L, so that the following relation is satisfied.

$$P:L=(2 \times Tp):(Th-Tp)$$

The flat portion L of the reproduction waveform can be consequently expressed as follows.

$$L=(Th-Tp) \times P/(2 \times Tp)$$

When the flat portion L which is obtained like the above equation relates to at least one sync block or more, therefore, at least one sync block ID is certainly detected, so that the search code can be detected.

In case of searching at an N-times speed, however, there is a case such that data of one sync block or more is reproduced from each track. When the data of one sync block or more is reproduced from each track, by previously writing the same ID at a specific position on each track, the ID can be certainly detected in any case.

Figure 7:
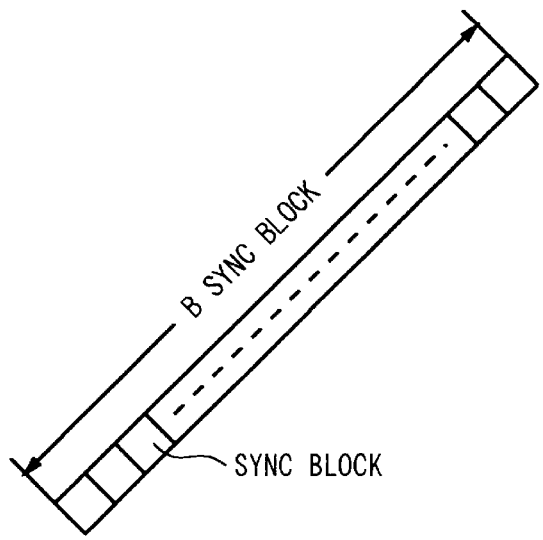
FIG. 7 is a schematic diagram which is used for explaining an example of the tape streamer drive to which the invention is applied.

In this instance, the number of sync blocks of data which is reproduced from each track is obtained. As shown in FIG. 7, the number of sync blocks of one track is set to B and the times speed is set to N. When the number of sync blocks of one track is equal to B, data of B blocks can be obtained by one scan. When the times speed is equal to N, data of B blocks can be obtained in N tracks. The number of blocks per track can be consequently obtained by (B/N=450/100). When the same ID is continuously written to blocks of the number of an integer that is larger than (B/N), the ID can be certainly detected in any case.

For example, when there is a prerequisite that the searching operation of 100-times speed is executed, assuming that the number of sync blocks in one track is set to 450, B/N=450/100=4.5, namely, by continuously writing the same ID into at least five sync blocks, the ID can be certainly detected.

When the data is recorded on the sync block unit basis and the searching operation is executed by using the ID of the sync block as mentioned above, conditions which enable the search code to be certainly detected upon searching are as follows.

(1) The flat portion of the reproduction waveform is set to the length in which data of one or more sync blocks can be arranged.

(2) The same ID is written by only the number of times corresponding to the number of sync blocks obtained from each track by one scan.

Figure 8:
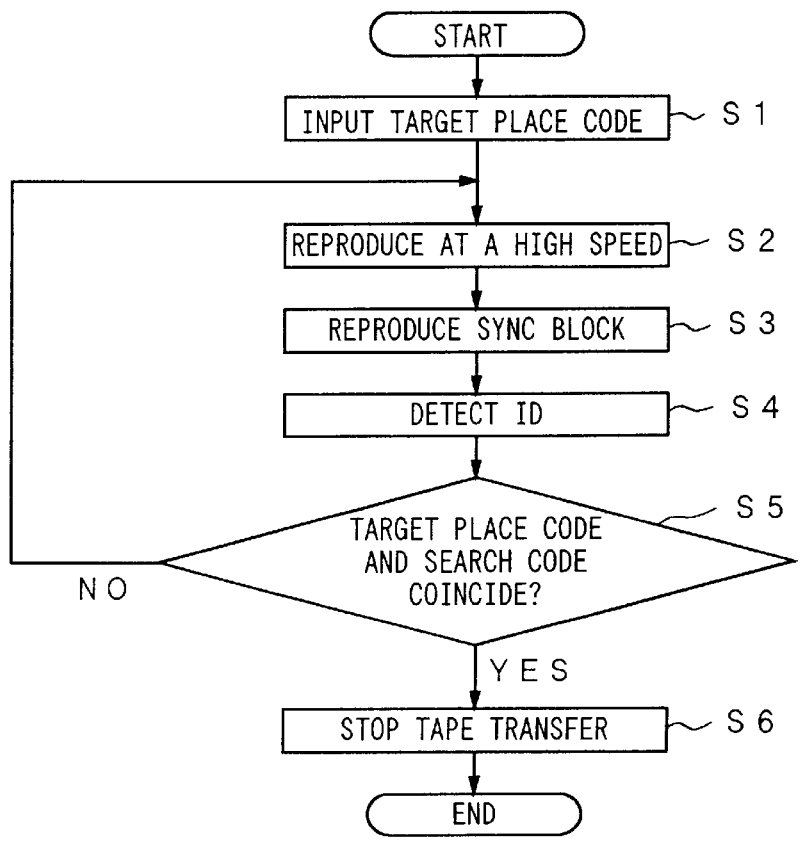
FIG. 8 is a flowchart which is used for explaining an example of the tape streamer drive to which the invention is applied.

FIG. 8 is a flowchart showing the operation in the searching mode. Upon searching, a search code of a target place of the system controller 12 is inputted from the host computer through the bus and the SCSI interface 13 (step S1). The system controller 12 controls the mechanism controller 7 and the reproduction is executed at the N-times speed (step S2). In this instance, the system controller 12 controls the feeding speed of the magnetic tape 5 so that at least one sync block is included in the flat portion of the reproduction waveform as shown in FIG. 4 that is outputted from the playback amplifier 10. The sync block is reproduced from the reproduction signals from the reproducing heads 3A and 3B by the demodulating circuit 11 (step S3). The ID of the sync block is detected by the ID detecting circuit 21 (step S4). The system controller 12 compares the reproduced search code with the code of the target place (step S5). The above processing steps are repeated until the reproduced search code and the code of the target place coincide. When it is judged that the reproduced search code and the code of the target place coincide, the system controller 12 stops the tape (step S6). Accordingly, the tape is fed until the target place.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A reproducing method of a helical scan system for reproducing data recorded on a tape-shaded recording medium by rotary heads, in which a track divided into a plurality of blocks each including ID information is formed on said tape-shaped recording medium, wherein said method comprises the steps of:

reproducing said blocks while feeding said tape-shaped recording medium at a high speed;

detecting a reproduction waveform of a reproduced signal;

feeding said tape-shaped recording medium so that a flat portion of said reproduction waveform which corresponds to a portion of said track which includes at least one of said blocks is reproduced in said reproducing step; and wherein when a track pitch is set to Tp and a reproduction head width is set to Th and a pitch of said reproduction waveform is set to P, a length L of the flat portion of said reproduction waveform is specified by the following equation:

$$L=(Th-Tp) \times P/(2 \times Tp).$$

2. An apparatus for reproducing data on slant tracks formed on a tape-shaped recording medium, comprising:

rotary heads having reproducing heads;

detecting means for detecting ID information in a plurality of blocks recorded on said track by output signals from said reproducing heads;

means for searching a desired position on said tape-shaped recording medium on the basis of said ID information detected while feeding said tape-shaped recording medium at a high speed; and wherein said searching means controls the feeding operation of said tape-shaped recording medium so that a reproduction waveform of the output signal from said reproducing head includes the data of at least one block in said flat portion, and wherein when a track pitch is set to Tp and a reproduction head width is set to Th and a pitch of said reproduction waveform is set to P, a length L of the flat portion of said reproduction waveform is specified by the following equation:

$$L=(Th-Tp) \times P/(2 \times Tp).$$

* * * * *